(12) United States Patent
Chung et al.

(10) Patent No.: US 9,716,399 B2
(45) Date of Patent: Jul. 25, 2017

(54) VEHICLE CHARGER

(71) Applicant: FAIRCHILD KOREA SEMICONDUCTOR LTD., Bucheon-si (KR)

(72) Inventors: Bong-Geun Chung, Incheon (KR); Youngbae Park, Bucheon-si (KR); Gwanbon Koo, Bucheon-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 229 days.

(21) Appl. No.: 14/706,472

(22) Filed: May 7, 2015

(65) Prior Publication Data

US 2015/0326047 A1    Nov. 12, 2015

Related U.S. Application Data

(60) Provisional application No. 61/989,781, filed on May 7, 2014.

(30) Foreign Application Priority Data

Apr. 30, 2015    (KR) .......................... 10-2015-0061742

(51) Int. Cl.
*H02J 7/00*    (2006.01)

(52) U.S. Cl.
CPC ............ *H02J 7/007* (2013.01); *H02J 7/0052* (2013.01); *H02J 2007/0062* (2013.01); *H02J 2007/0096* (2013.01)

(58) Field of Classification Search
CPC ........ H02J 7/007; H02J 7/0003; H02J 7/0004; H02J 7/0054; H02J 7/0055; H02J 7/0027; H02J 7/0052

See application file for complete search history.

(56) References Cited

U.S. PATENT DOCUMENTS

| 5,777,457 A | 7/1998 | Lee |
| 2014/0253019 A1* | 9/2014 | Wang .................... H02J 7/0052 320/107 |

FOREIGN PATENT DOCUMENTS

CN    1272887    *    8/2006    ............ H01M 10/44

* cited by examiner

*Primary Examiner* — Drew A Dunn
*Assistant Examiner* — Sailesh Thapa (57) ABSTRACT

A vehicle charger includes a power supply device, a communication module, a reference changing unit, a compensator, a controller, and a gate driver. The power supply device changes an input voltage into a voltage required to charge a portable device and outputs the changed voltage. The communication module receives information on at least one of a voltage and a current, which are required to charge the portable device. The reference changing unit generates at least one of a reference voltage and a reference current based on the information on the at least one of the voltage and the current. The compensator generates a compensation signal based on a result obtained by comparing the at least one of the reference voltage and the reference current with at least one of a sensed voltage and a sensed current, which are obtained by sensing at least one of an output voltage of the power supply device and a current supplied from the power supply device to the portable device. The controller generates a gate driving signal according to the compensation signal. The gate driver generates a gate voltage for controlling switching operation of the power supply device according to the gate driving signal.

14 Claims, 11 Drawing Sheets

VEHICLE CHARGER

CROSS-REFERENCE TO RELATED APPLICATION

This application claims priority from U.S. Patent Provisional Application No. 61/989,781, filed on May 7, 2014, in the United States Patent & Trademark Offices (USPTO), and Korean Patent Application No. 10-2015-0061742, filed with the Korean Intellectual Property Office on Apr. 30, 2015, the entire contents of which are incorporated herein by reference.

BACKGROUND

1. Field of Invention

Embodiments relate to a vehicle charger.

2. Description of the Related Art

Many different portable devices require different input voltages. The time required to charge a portable device through a vehicle charger or cigarette lighter adapter (CLA) in a vehicle is very long, or portable devices are not fully charged through the vehicle charger or CLA. This is because the vehicle charger or CLA is configured as a step-down converter such as a buck converter.

For example, when a portable device having an input voltage higher than an output voltage of a battery in a vehicle is charged, the power supplied from a vehicle charger or CLA is insufficient, and therefore, the charging speed of the portable device is very slow, or the portable device cannot be fully charged. In addition, if the output voltage of the battery further decreases due to cold weather, the charging speed of the portable device may become slower.

SUMMARY OF THE INVENTION

Accordingly, embodiments are directed to a vehicle charger which enables portable devices to be charged regardless of types thereof.

According to an aspect of the invention for achieving the objects, there is provided a vehicle charger including: a power supply device configured to change an input voltage into a voltage required to charge a portable device and output the changed voltage; a communication module configured to receive information on at least one of a voltage and a current, which are required to charge the portable device; a reference changing unit configured to generate at least one of a reference voltage and a reference current based on the information on the at least one of the voltage and the current; a compensator configured to generate a compensation signal based on a result obtained by comparing the at least one of the reference voltage and the reference current with at least one of a sensed voltage and a sensed current, which are obtained by sensing at least one of an output voltage of the power supply device and a current supplied from the power supply device to the portable device; a controller configured to generate a gate driving signal according to the compensation signal; and a gate driver configured to generate a gate voltage for controlling switching operation of the power supply device according to the gate driving signal.

The power supply device may step up or step down the input voltage according to the gate voltage.

The compensator may generate a compensation signal by compensating for a difference between the sensed voltage and the reference voltage. Alternatively, the compensator may generate a compensation signal by compensating for a difference between the sensed current and the reference current.

The vehicle charger may include a chip including at least the communication module, the reference changing unit, the compensator, and the controller. Alternatively, the vehicle charger may include a chip including at least the communication module, the reference changing unit, the controller, and the gate driver.

The vehicle charger may include a chip including at least the communication module, the reference changing unit, the controller, and a switching unit of the power supply device. The chip may further include the gate driver. The chip may further include the compensator. The chip may further include a power transmitting unit of the power supply device.

The vehicle charger may stop operation of the power supply device by detecting pollution of a USB cable terminal through which the power supply device is connected to the portable device or a connection terminal of the portable device.

The vehicle charger may further include a protector configured to generate a protection signal by detecting the pollution of the USB cable terminal through which the power supply device is connected to the portable device or the connection terminal of the portable device.

The vehicle charger may include a chip including at least the protector, the communication module, the reference changing unit, and the controller. The chip may further include the switching unit of the power supply device.

Embodiments may provide the vehicle charger which enables portable devices to be charged regardless of types thereof.

BRIEF DESCRIPTION OF THE DRAWINGS

The above and other objects, features and advantages of the invention will become apparent from the following description of a preferred embodiment given in conjunction with the accompanying drawings, in which.

DETAILED DESCRIPTION OF THE EMBODIMENTS

The invention will be described more fully hereinafter with reference to the accompanying drawings, in which exemplary embodiments of the invention are shown. Exemplary embodiments of the invention are described below in sufficient detail to enable those of ordinary skill in the art to embody and practice the invention. The invention may, however, be embodied in different forms and should not be construed as limited to the embodiments set forth herein. In the descriptions of the invention, known configurations that are not related to the gist of the invention may be omitted. With the addition of reference numerals in components of each drawing, like reference numerals refer to like components.

Throughout the specification, it will be understood that when an element is referred to as being "connected" or "coupled" to another element, it can be "directly" connected or coupled to the other element or "electrically" connected or coupled via intervening elements which may be present. Further, it will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Portable devices have various input voltages. For example, the input voltage of a portable device may be one of 5V, 9V, and 12V. In order to charge portable devices having various input voltages, a vehicle charger according to an embodiment of the invention communicates with a portable device through a corresponding protocol, to acquire information on at least one of a voltage and a current, which are required to charge the portable device. A voltage required to charge a portable device is determined based on an input voltage of the portable device. In order to charge a portable device at high speed, a voltage higher than the input voltage of the portable device may be determined as an output voltage of the vehicle charger. The vehicle charger can determine an output voltage based on the acquired information, and control switching operation of a power switch so as to supply the determined output voltage.

Hereinafter, various embodiments will be described with reference to the accompanying drawings.

Figure 1:
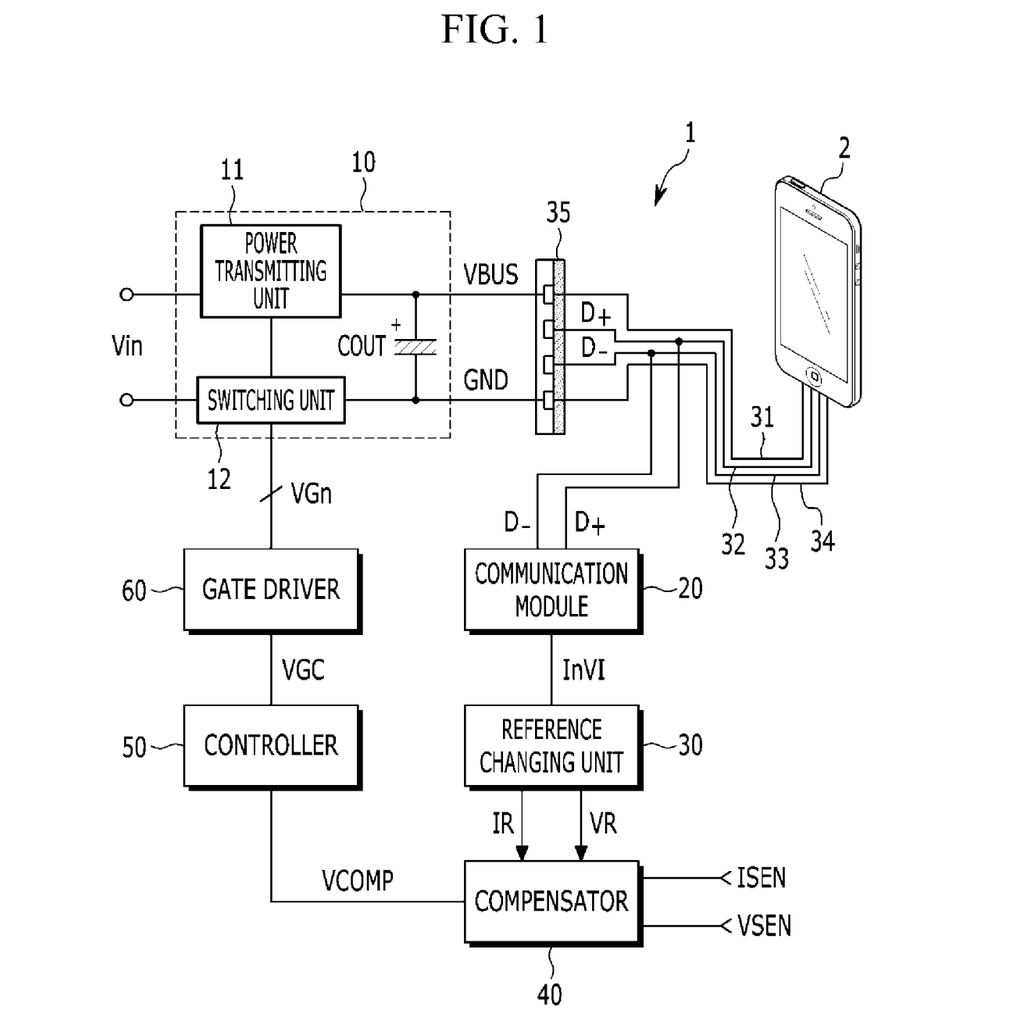
FIG. 1 is a diagram illustrating a vehicle charger according to a first embodiment of the invention.

FIG. 1 is a diagram illustrating a vehicle charger according to a first embodiment of the invention.

As shown in FIG. 1, the vehicle charger 1 includes a power supply device 10, a communication module 20, a reference changing unit 30, a compensator 40, a controller 50, and a gate driver 60. The vehicle charger 1 may be connected to a portable device 2 through a USB cable. The USB cable may be configured with four lines 31 to 34 and a USB connection terminal 35.

The four lines 31 to 34 are connected to the USB connection terminal 35. A bus voltage VBUS is supplied to the portable device 2 through a line 31, and the portable device 2 is connected to a ground GND through a line 34. Signals D+ and D− are transmitted from the portable device 2 to the USB connection terminal 35 respectively through lines 32 and 33. The signals D+ and D− may include information on at least one of a voltage and a current, which are required to charge the portable device.

The power supply device 10 generates the bus voltage VBUS by using an input voltage Vin. The power supply device 10 may supply a voltage required to charge the portable device 2.

The power supply device 10 includes a power transmitting unit 11, a switching unit 12, and a capacitor COUT. The power transmitting unit 11 may be an inductor or transformer, and the power transmitted to the portable device 2 through the power transmitting unit 11 is controlled according to switching operation of the switching unit 12. The capacitor COUT may reduce the ripple of the bus voltage VBUS.

The communication module 20 is connected to the lines 32 and 33, and receives the signals D+ and D− transmitted through the respective lines 32 and 33. The communication module 20 identifies information on at least one of a voltage and a current, which are required to charge the portable device 2 (hereinafter, referred to as voltage/current information), based on the signals D+ and D−. The communication module 20 transmits voltage/current information InVI to the reference changing unit 30.

The reference changing unit 30 generates at least one of a reference voltage VR and a reference current IR in accordance with the voltage/current information InVI and supplies the at least one of the reference voltage VR and the reference current IR to the compensator 40.

The compensator 40 generates a compensation signal VCOMP based on a result obtained by comparing at least one of the reference voltage VR and the reference current IR with at least one of a sensed voltage VSEN and a sensed current ISEN. The sensed voltage VSEN is a voltage obtained by sensing an output voltage of the power supply device 10, i.e., the bus voltage VBUS, and the sensed current ISEN is a current obtained by sensing a current supplied from the power supply device 10 to the portable device 2.

For example, the compensator 40 may generate the compensation signal VCOMP by compensating for a difference between the sensed voltage VSEN and the reference voltage VR. Alternatively, the compensator 40 may generate the compensation signal VCOMP by compensating for a difference between the sensed current ISEN and the reference current IR.

The controller 50 generates a gate driving signal VGC according to the compensation signal VCOMP. For example, the controller 50 may generate the gate driving signal VGC based on a result obtained by comparing a sawtooth wave with the compensation signal VCOMP. Alternatively, the controller 50 may generate the gate driving signal VGC based on a result obtained by comparing a current flowing through a switch of the switching unit 12 with the compensation signal VCOMP.

The gate driver 60 generates a gate voltage VGn for controlling switching operation of the switching unit 12 according to the gate driving signal VGC. In a case where a plurality of switches constitute the switching unit 12, the gate driver 60 may generate gate voltages VGn as many as the number of the switches.

The power supply device 10 may generate the bus voltage VBUS by stepping up or stepping down the input voltage Vin according to the switching operation of the switching unit 12. For example, in a case where the voltage required to charge the portable device 2 is higher than the input voltage Vin, the power supply device 10 may step up the input voltage Vin. Alternatively, in a case where the voltage required to charge the portable device 2 is lower than the input voltage Vin, the power supply device 10 may step down the input voltage Vin.

The vehicle charger 1 may perform protecting operation. For example, in a case where the USB cable terminal 35 or a terminal through which the plurality of lines 31 to 34 are coupled to the portable device 2 is polluted, protecting operation of the controller 50 may be started. If the protecting operation is started, the operation of the power supply device 10 may be stopped.

The vehicle charger 1 according to the first embodiment of the invention can control the power supply device 10 based on a result obtained by comparing at least one of a sensed voltage and a sensed current with information on at least one of a voltage and a current, which are required to charge the portable device 2, through communication with the portable device 2.

Some of the plurality of components constituting the vehicle charger 1 may be embodied as a monolithic chip.

Hereinafter, descriptions overlapping with the first embodiment described with reference to FIG. 1 will be omitted.

Figure 2:
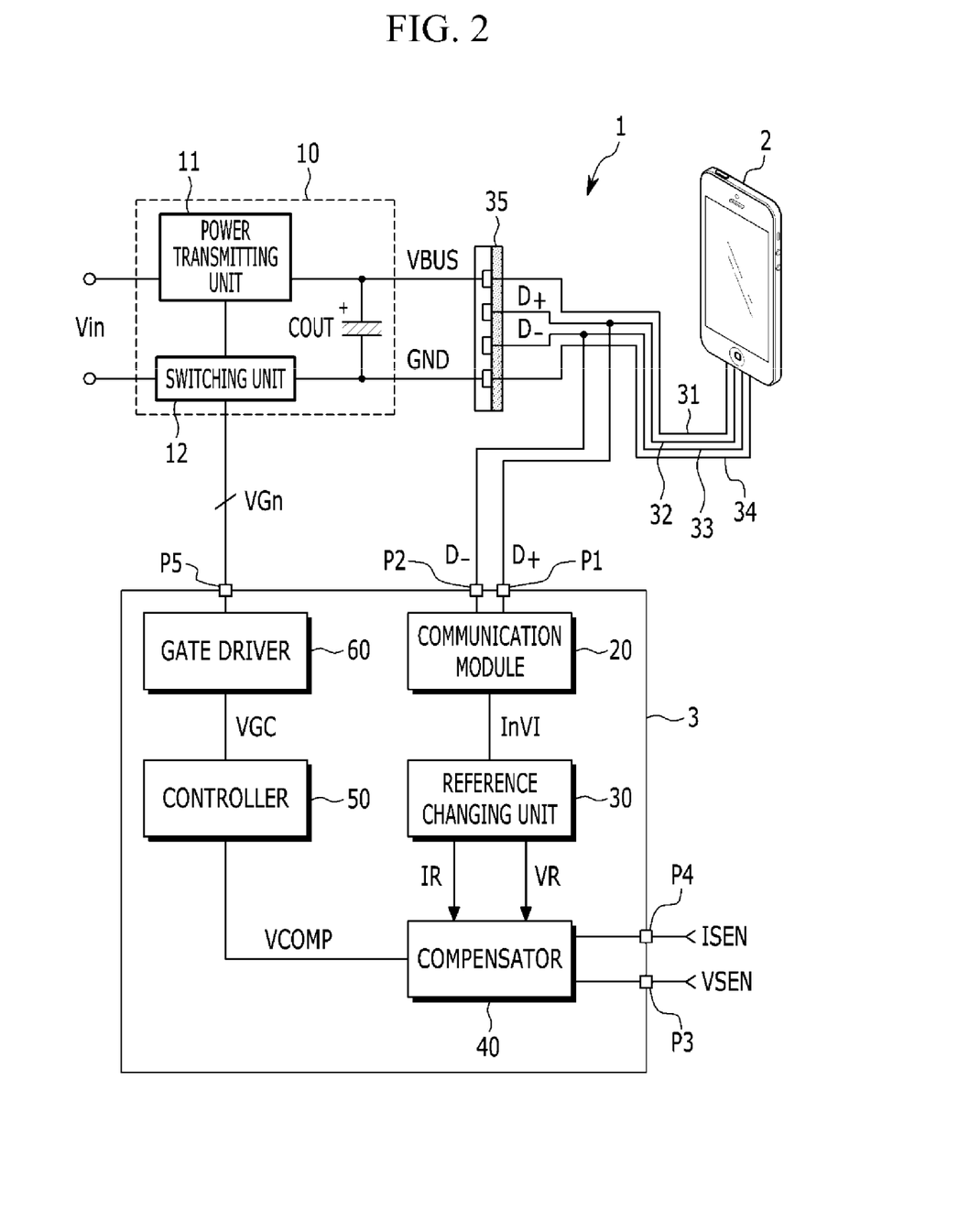
FIG. 2 is a diagram illustrating a vehicle charger according to a second embodiment of the invention.

FIG. 2 is a diagram illustrating a vehicle charger according to a second embodiment of the invention.

As shown in FIG. 2, a communication module 20, a reference changing unit 30, a compensator 40, a controller 50, and a gate driver 60 may be embodied as an IC chip 3. The IC chip 3 may include five pins P1 to P5.

Signals D+ and D− may be input to the communication module 20 respectively through pins P1 and P2, and a sensed voltage VSEN and a sensed current ISEN may be input to the compensator 40 respectively through pins P3 and P4. A gate voltage VGn may be transmitted from the gate driver 60 to a switching unit 12 through the pin P5.

Figure 3:
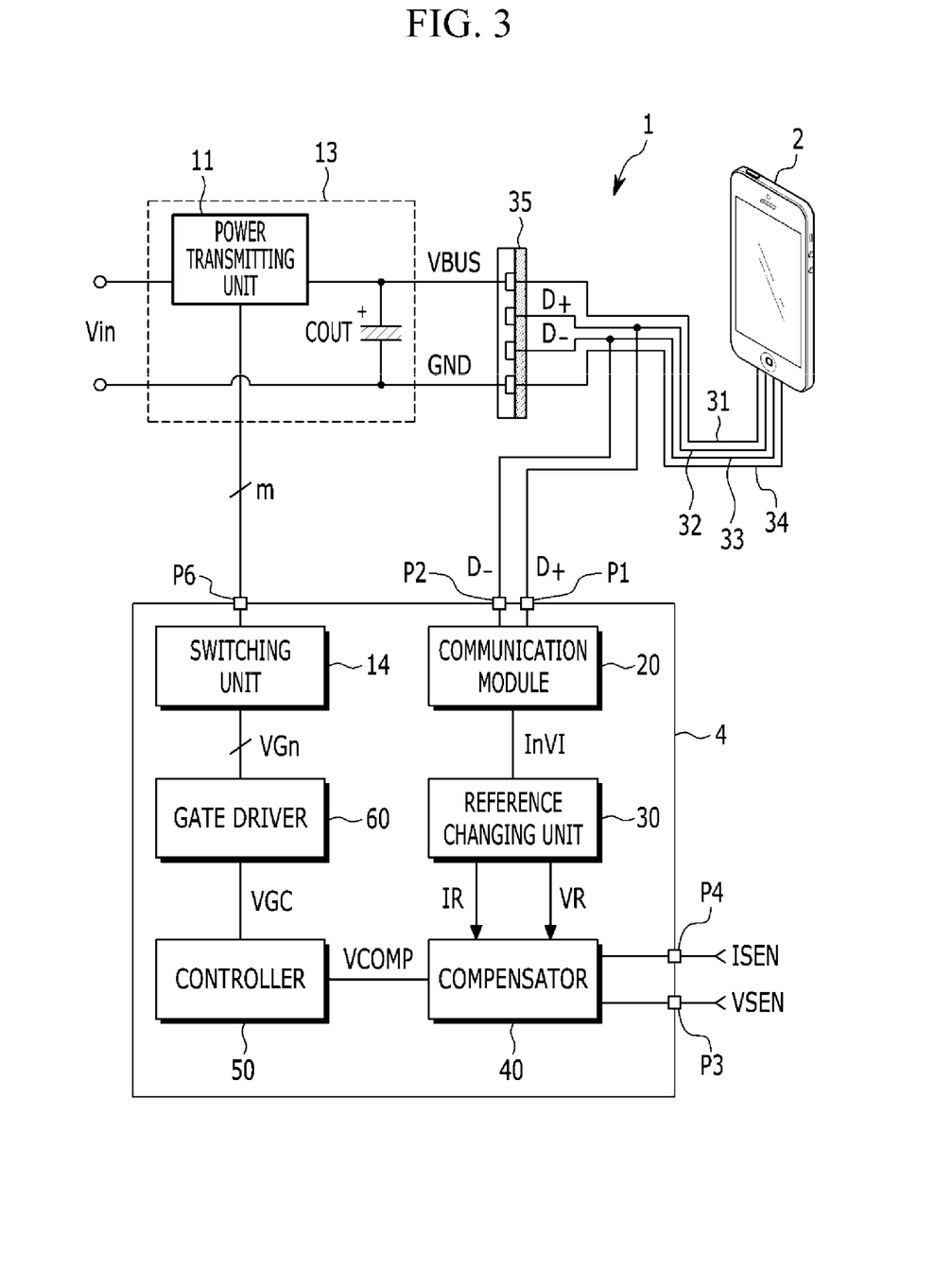
FIG. 3 is a diagram illustrating a vehicle charger according to a third embodiment of the invention.

FIG. 3 is a diagram illustrating a vehicle charger according to a third embodiment of the invention.

As shown in FIG. 3, a switching unit 14, a communication module 20, a reference changing unit 30, a compensator 40, a controller 50, and a gate driver 60 may be embodied as an IC chip 4. The IC chip 4 may include at least five pins P1 to P4 and P6.

Unlike the aforementioned embodiment, the switching unit 14 of a power supply device 13 is included in the IC chip 4. For example, the switching unit 14 is connected to a power transmitting unit 11 through a pin P6, to control operation of the power supply device 13. In a case where a plurality of switches constitute the switching unit 14 connected to the power transmitting unit 11, a number of pins may be added as many as the number of the switches. In FIG. 3, it is illustrated that the switching unit 14 and the power transmitting unit 11 may be connected through a plurality of lines (e.g., m lines). The number of pins may also be m in total including the pin P6.

Figure 4:
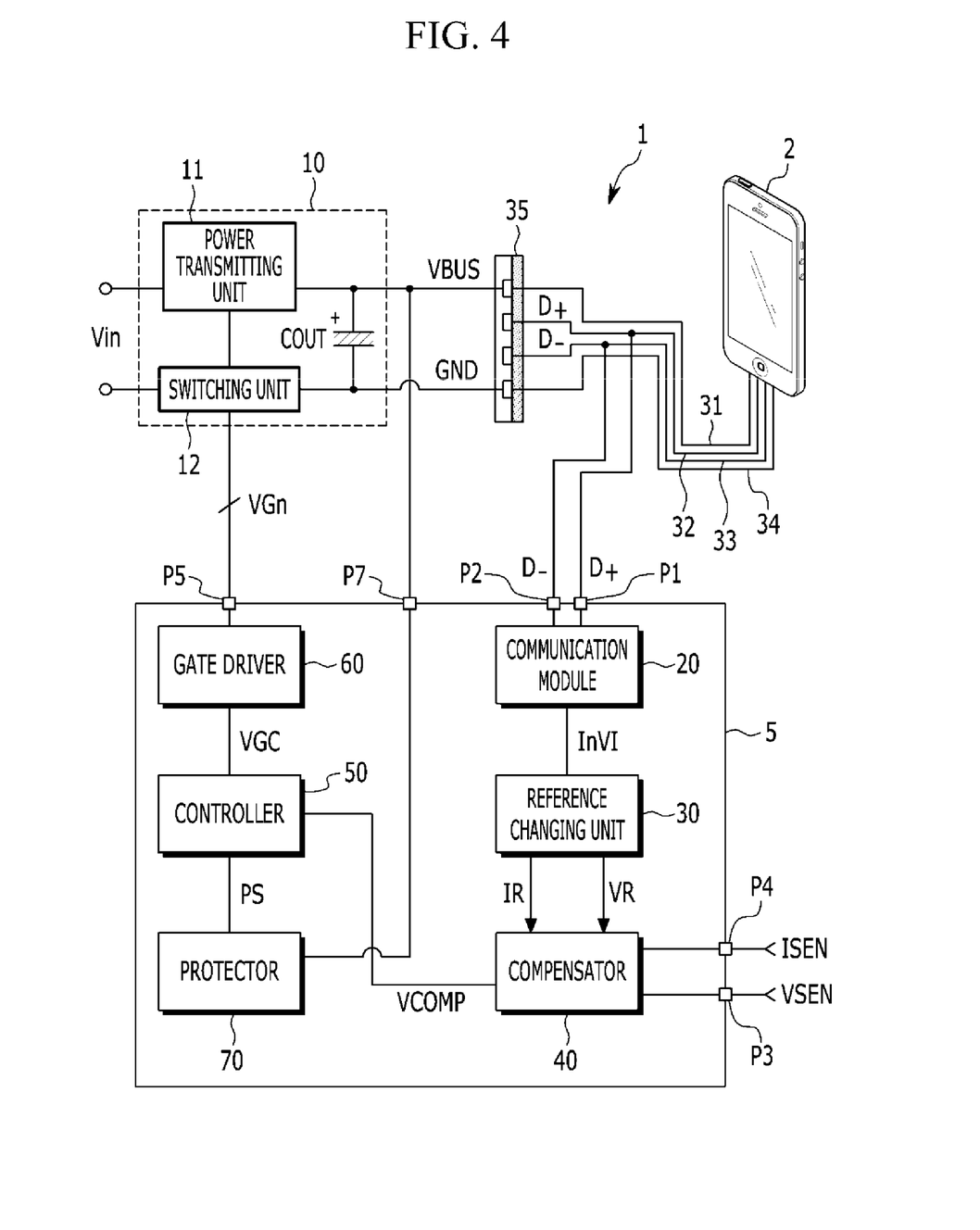
FIG. 4 is a diagram illustrating a vehicle charger according to a fourth embodiment of the invention.

FIG. 4 is a diagram illustrating a vehicle charger according to a fourth embodiment of the invention.

As shown in FIG. 4, a communication module 20, a reference changing unit 30, a compensator 40, a controller 50, a gate driver 60, and a protector 70 may be embodied as an IC chip 5. The IC chip 5 may include six pins P1 to P5 and P7.

Unlike the aforementioned embodiment, the vehicle charger 1 further includes a protector 70. The protector 70 is a component for starting protecting operation of the controller 50, and can detect pollution of a USB cable terminal 35 or a terminal through which a plurality of lines 31 to 34 are coupled to a portable device 2. For example, a foreign material like dust is caught in the USB cable terminal 35 or the terminal, and then at least one of an impedance between a VBUS terminal and a GND terminal, impedance between a VBUS terminal and a D+ terminal, and impedance between a VBUS terminal and a D+ terminal, becomes so low as to make a current flow from the VBUS terminal to at least one of the GND terminal, D+ terminal, and D− terminal, respectively. This current makes the USB cable terminal 35 or the terminal melt, and furthermore, the portable device 2 to burn. In addition, pollution damages the USB cable terminal 35 and the terminal.

If the pollution is detected, the protector 70 transmits a protection signal PS to the controller 50. The controller 50 may generate a gate driving signal VGC for stopping switching operation according to the protection signal PS.

The protector 70 supplies a predetermined signal through a pin P7 to detect pollution of the terminal, and senses a bus voltage VBUS, thereby detecting the pollution of the terminal.

Figure 5:
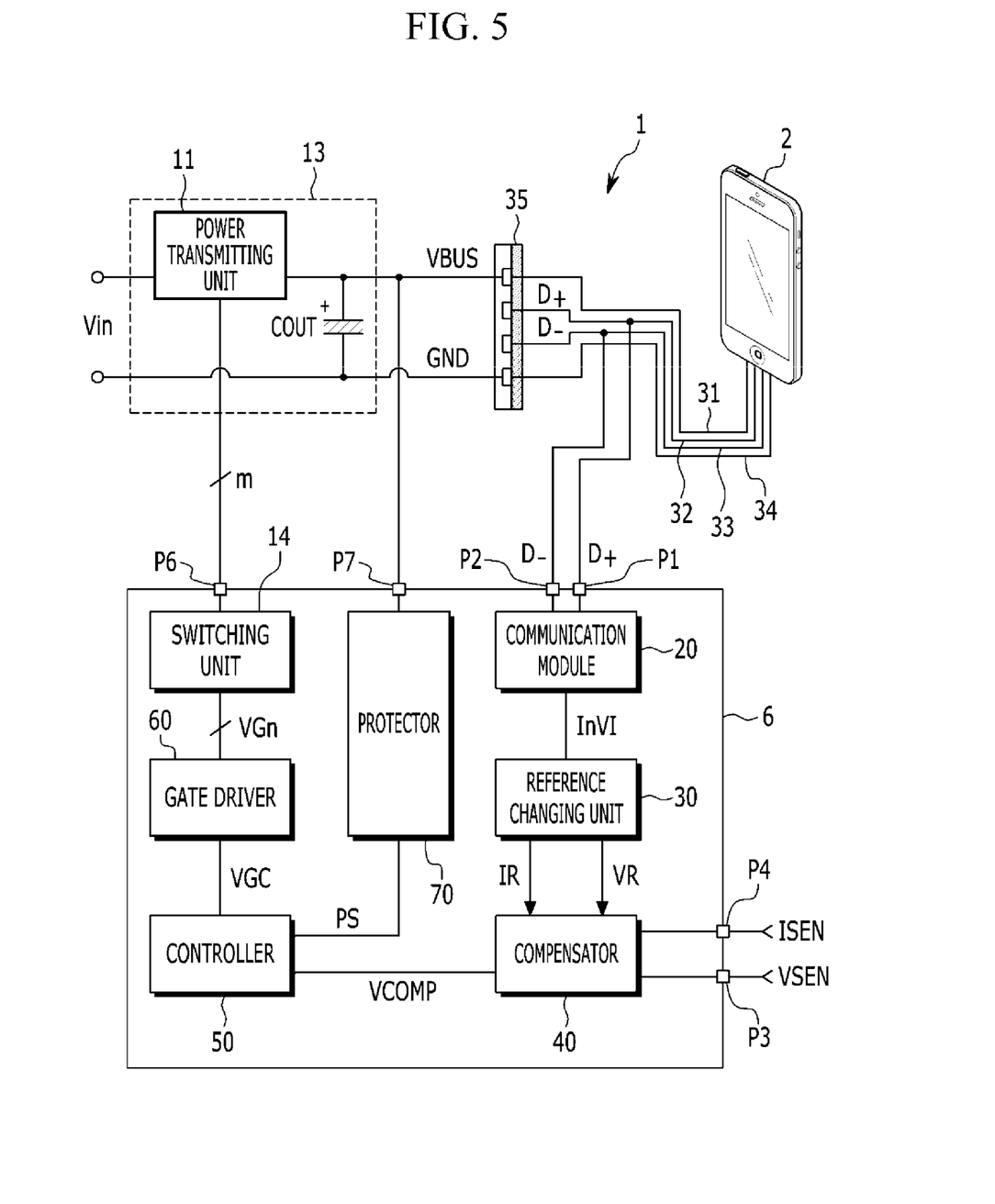
FIG. 5 is a diagram illustrating a vehicle charger according to a fifth embodiment of the invention.

FIG. 5 is a diagram illustrating a vehicle charger according to a fifth embodiment of the invention.

As shown in FIG. 5, a switching unit 14, a communication module 20, a reference changing unit 30, a compensator 40, a controller 50, a gate driver 60, and a protector 70 may be embodied as an IC chip 6. The IC chip 6 may include at least six pins P1 to P4, P6, and P7.

Like the third embodiment, a plurality of switches may constitute the switching unit 14 connected to a power transmitting unit 11, and the switching unit 14 and the power transmitting unit 11 may be connected through a plurality of lines (e.g., m lines). The number of pins may also be m in total including a pin P6.

Figure 6:
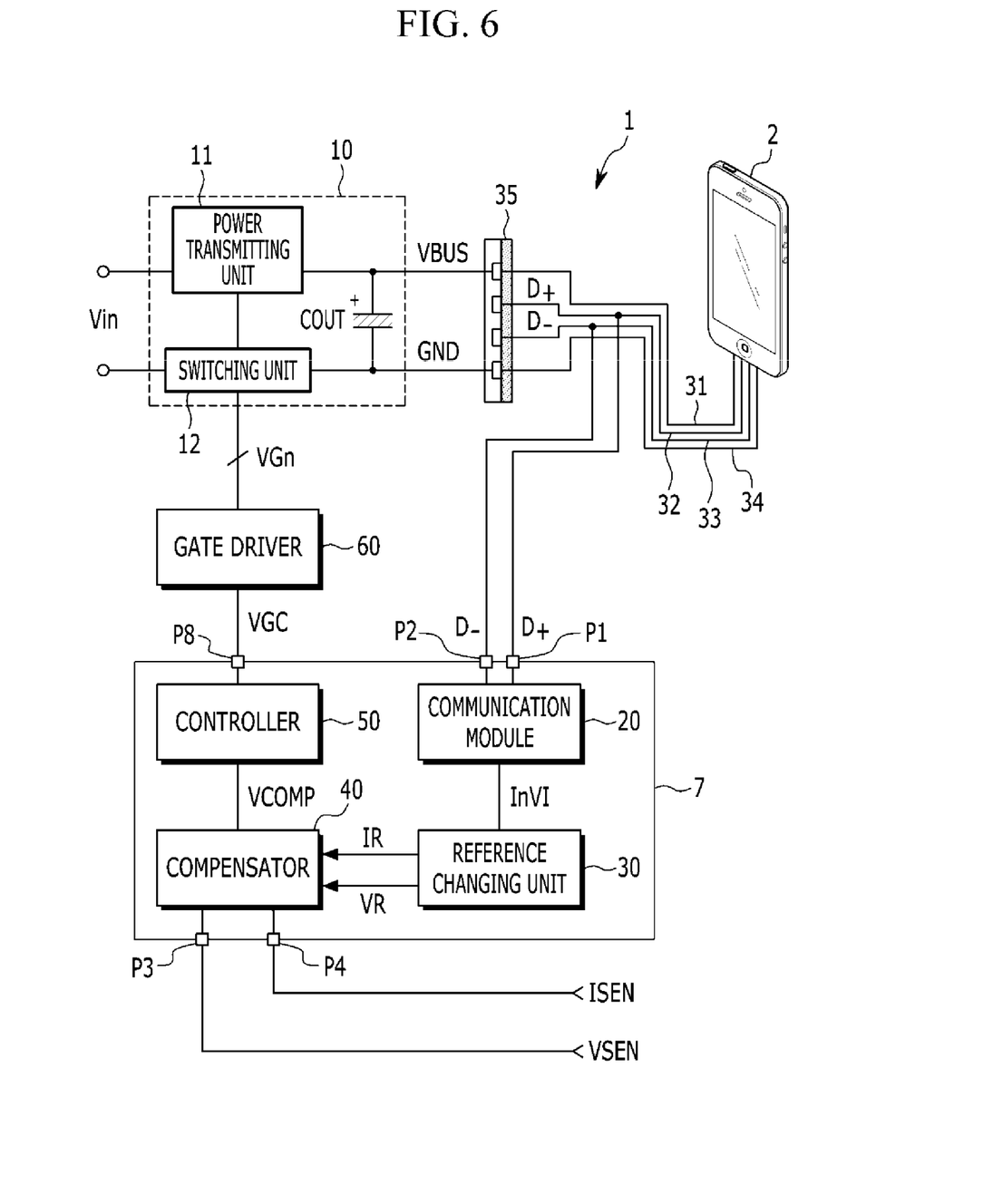
FIG. 6 is a diagram illustrating a vehicle charger according to a sixth embodiment of the invention.

FIG. 6 is a diagram illustrating a vehicle charger according to a sixth embodiment of the invention.

In the sixth embodiment, a gate driver 60 may be formed at the outside of an IC chip, as compared with the second embodiment shown in FIG. 2.

As shown in FIG. 6, a communication module 20, a reference changing unit 30, a compensator 40, and a controller 50 may be embodied as an IC chip 7. The IC chip 7 may include five pins P1 to P4 and P8.

Signals D+ and D− may be input to the communication module 20 respectively through pins P1 and P2, and a sensed voltage VSEN and a sensed current ISEN may be input to the compensator 40 respectively through pins P3 and P4. A gate driving signal VGC may be transmitted from the controller 50 to the gate driver 60 through a pin P8.

Figure 7:
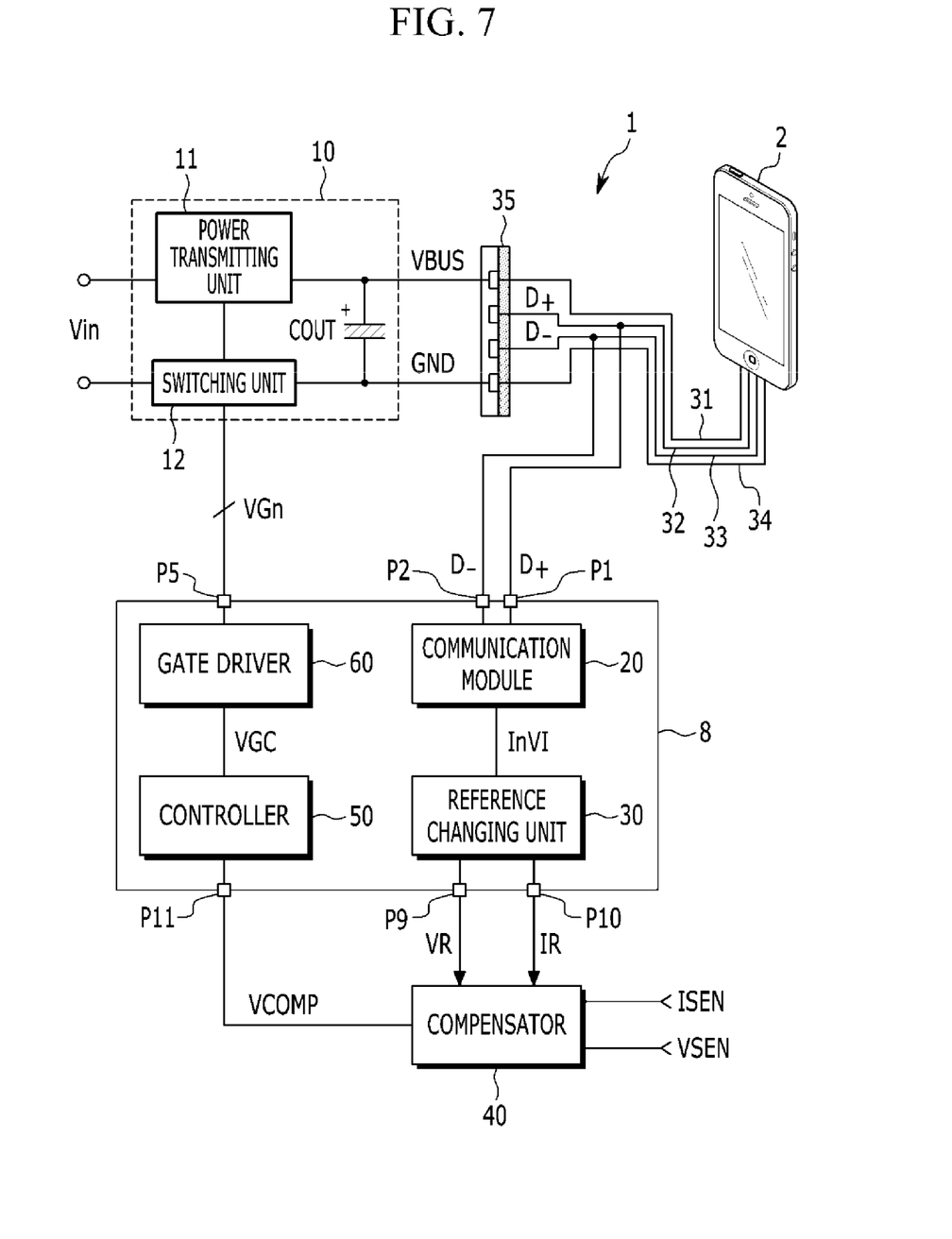
FIG. 7 is a diagram illustrating a vehicle charger according to a seventh embodiment of the invention.

FIG. 7 is a diagram illustrating a vehicle charger according to a seventh embodiment of the invention.

In the seventh embodiment, a compensator 40 may be formed at the outside of an IC chip, as compared with the second embodiment shown in FIG. 2.

As shown in FIG. 7, a communication module 20, a reference changing unit 30, a controller 50, and a gate driver 60 may be embodied as an IC chip 8. The IC chip 8 may include six pins P1, P2, P5, and P9 to P11.

Signals D+ and D− may be input to the communication module 20 respectively through pins P1 and P2, and a reference voltage VR and a reference current IR may be input from the reference changing unit 30 to the compensator 40 respectively through pins P9 and P10. A compensation signal VCOMP may be transmitted from the compensator 40 to the controller 50 through a pin P11, and a gate voltage VGn may be transmitted from the gate driver 60 to a switching unit 12 of a power supply device 10 through a pin P5.

Figure 8:
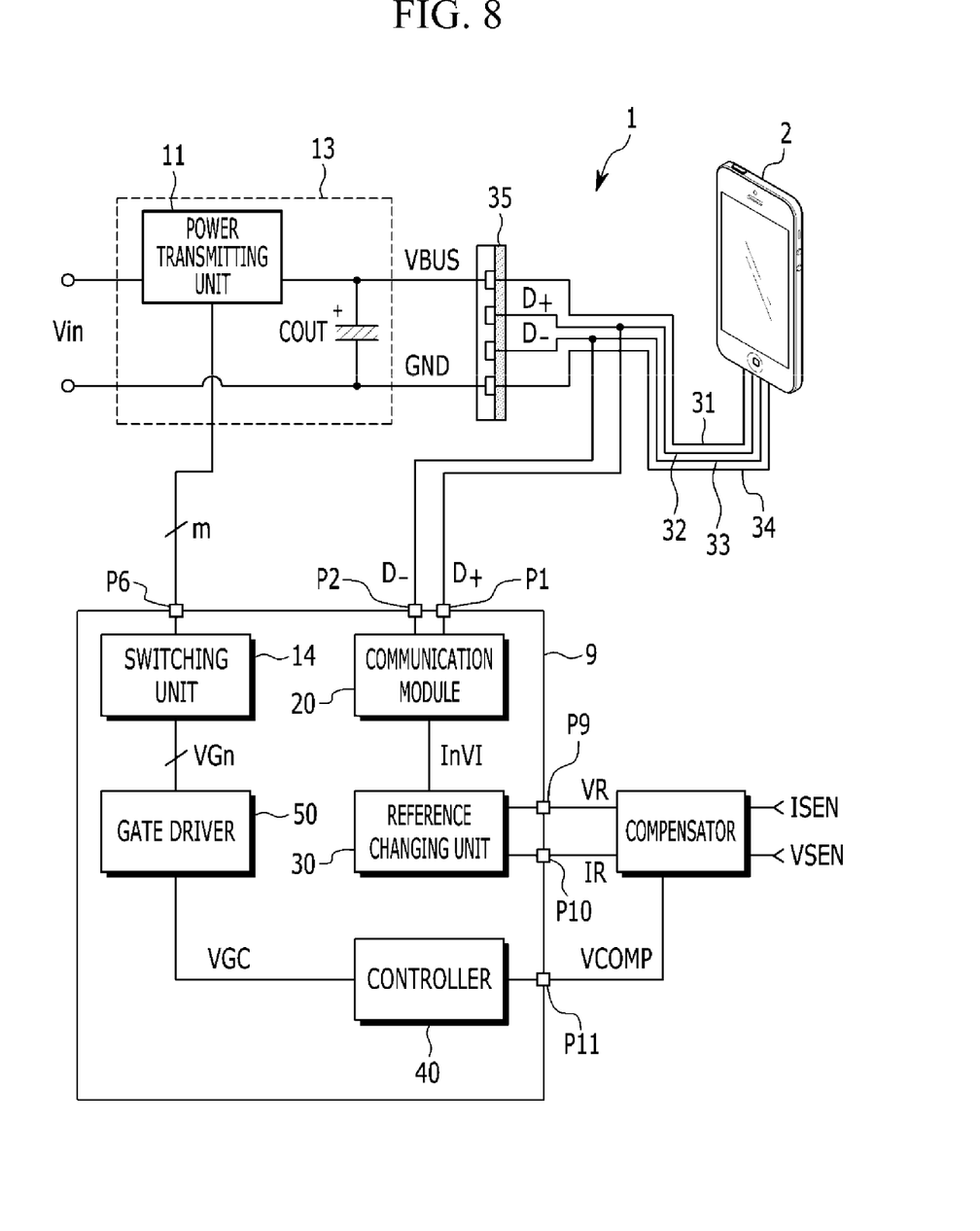
FIG. 8 is a diagram illustrating a vehicle charger according to an eighth embodiment of the invention.

FIG. 8 is a diagram illustrating a vehicle charger according to an eighth embodiment of the invention.

As shown in FIG. 8, a communication module 20, a reference changing unit 30, a controller 50, a gate driver 60, and a switching unit 14 may be embodied as an IC chip 9. The IC chip 9 may include at least six pins P1, P2, P6, and P9 to P11.

Like the third embodiment, the switching unit 14 of a power supply device 13 is included in the IC chip 9. The switching unit 14 is connected to a power transmitting unit 11 through a pin P6 to control operation of the power supply device 13. A plurality of switches may constitute the switching unit 14 connected to the power transmitting unit 11, and the switching unit 14 and the power transmitting unit 11 may be connected through a plurality of lines (e.g., m lines). The number of pins may also be m in total including the pin P6.

Unlike the third embodiment, in the eighth embodiment, a compensator 40 is formed at the outside of the IC chip 9. A reference voltage VR and a reference current IR may be input from the reference changing unit 30 to the compensator 40 respectively through pins P9 and P10. A compensation signal VCOMP may be transmitted from the compensator 40 to the controller 50 through a pin P11.

Figure 9:
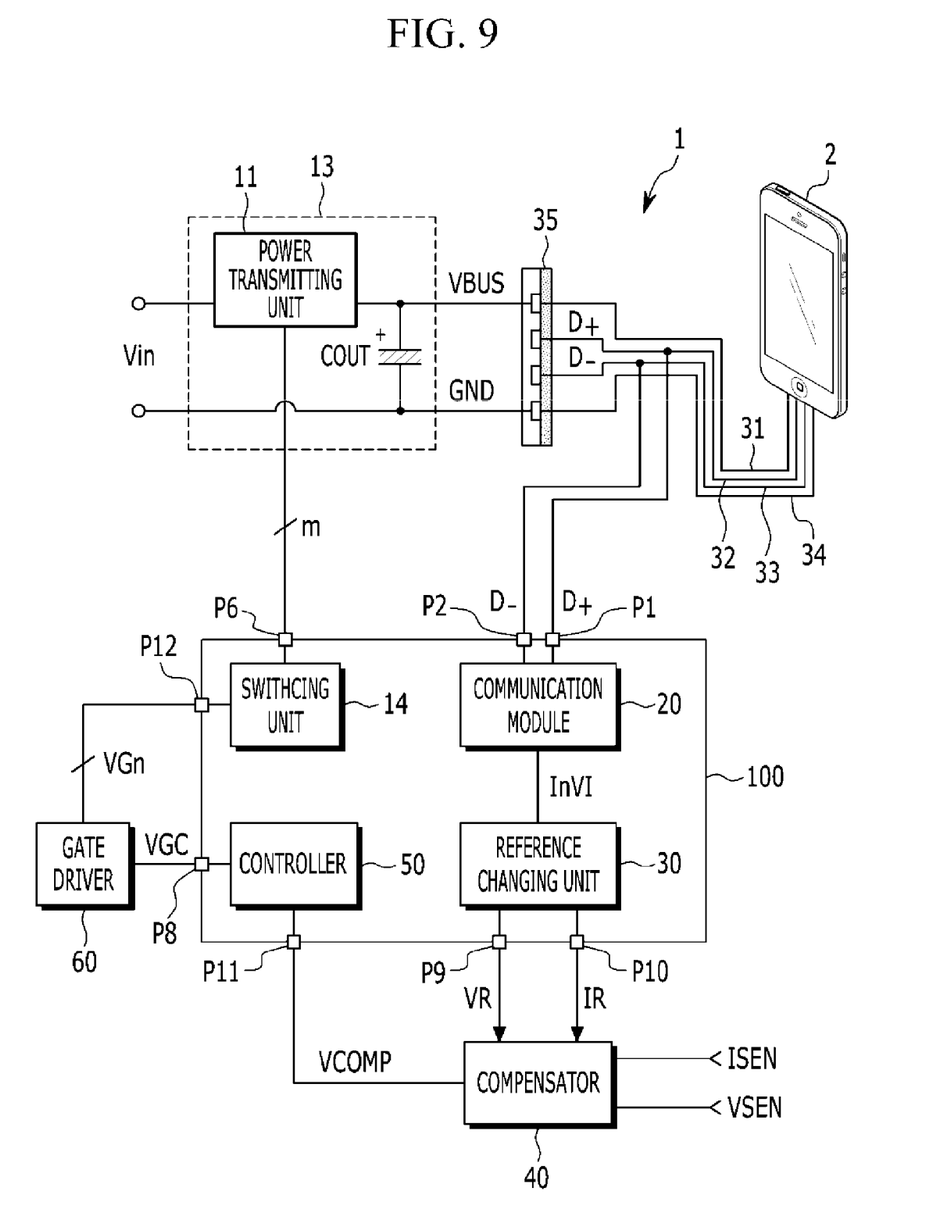
FIG. 9 is a diagram illustrating a vehicle charger according to a ninth embodiment of the invention.

FIG. 9 is a diagram illustrating a vehicle charger according to a ninth embodiment of the invention.

As shown in FIG. 9, a communication module 20, a reference changing unit 30, a controller 50, and a switching unit 14 may be embodied as an IC chip 100. The IC chip 100 may include at least eight pins P1, P2, P6, and P8 to P12.

Like the third embodiment, the switching unit 14 of a power supply device 13 is included in the IC chip 100. The switching unit 14 is connected to a power transmitting unit 11 through a pin P6 to control operation of the power supply device 13. A plurality of switches may constitute the switching unit 14 connected to the power transmitting unit 11, and the switching unit 14 and the power transmitting unit 11 may be connected through a plurality of lines (e.g., m lines). The number of pins may also be m in total including the pin P6.

Unlike the third embodiment, in the ninth embodiment, a compensator 40 and a gate driver 60 are formed at the outside of the IC chip 100. A reference voltage VR and a reference current IR may be input from the reference changing unit 30 to the compensator 40 respectively through pins P9 and P10. A compensation signal VCOMP may be transmitted from the compensator 40 to the controller 50 through a pin P11, and a gate driving signal VGC may be transmitted from the controller 50 to the gate driver 60 through a pin P8. A gate voltage VGn may be transmitted from the gate driver 60 to the switching unit 14 through a pin P12.

Figure 10:
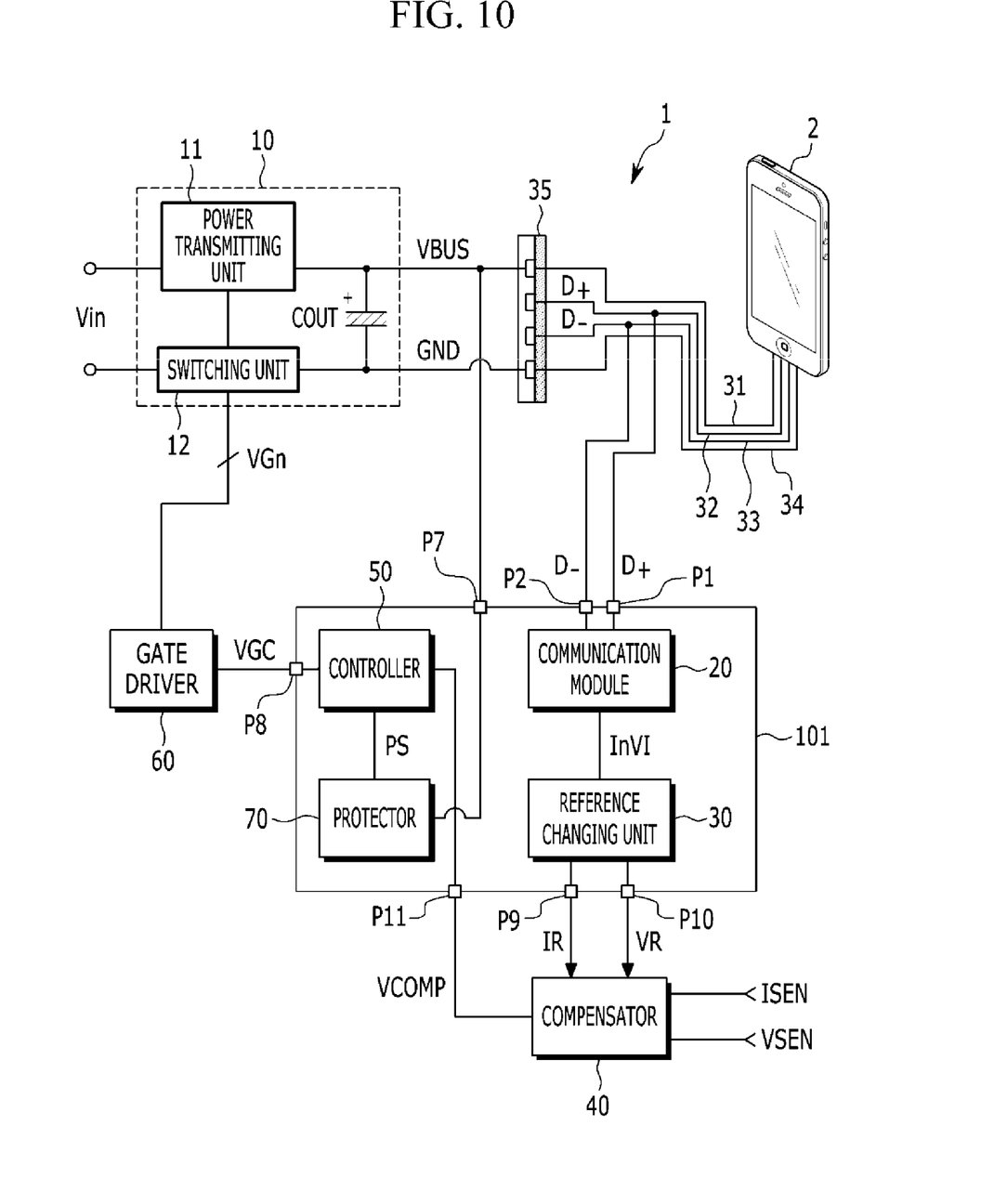
FIG. 10 is a diagram illustrating a vehicle charger according to a tenth embodiment of the invention.

FIG. 10 is a diagram illustrating a vehicle charger according to a tenth embodiment of the invention.

As shown in FIG. 10, a communication module 20, a reference changing unit 30, a protector 70, and a controller 50 may embodied as an IC chip 101. The IC chip 101 may include seven pins P1, P2, and P7 to P11.

Like the fourth embodiment, the protector 70 is included in the IC chip 101. The protector 70 senses a bus voltage VBUS through a pin P7, thereby detecting pollution of a terminal. Unlike the fourth embodiment, a compensator 40 and a gate driver 60 are formed at the outside of the IC chip 101.

A reference voltage VR and a reference current IR may be input from the reference changing unit 30 to the compensator 40 respectively through pins P9 and P10. A compensation signal VCOMP may be transmitted from the compensator 40 to the controller 50 through a pin P11, and a gate driving signal VGC may be transmitted from the controller 50 to the gate driver 60 through a pin P8.

Figure 11:
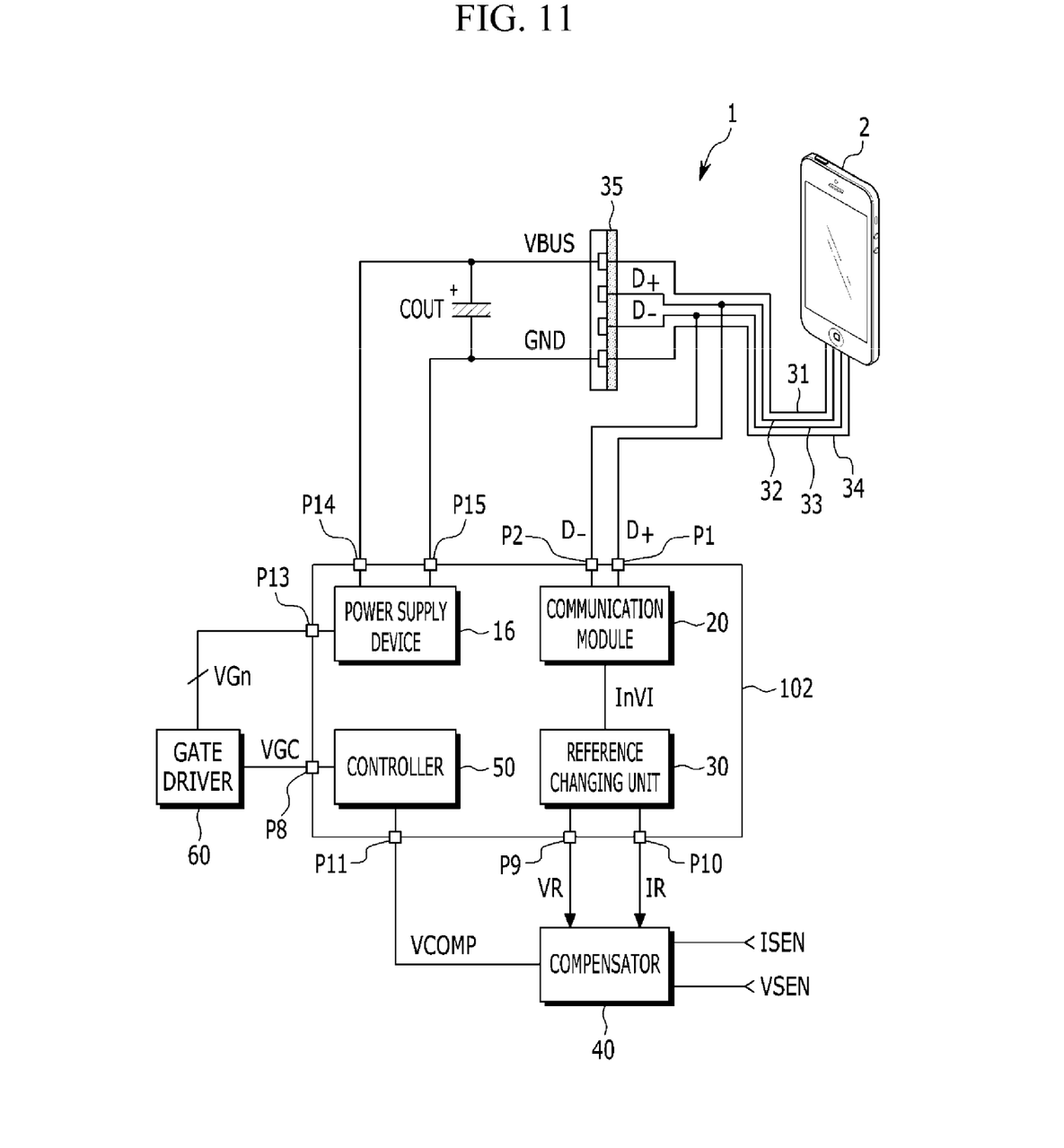
FIG. 11 is a diagram illustrating a vehicle charger according to an eleventh embodiment of the invention.

FIG. 11 is a diagram illustrating a vehicle charger according to an eleventh embodiment of the invention.

As shown in FIG. 11, a communication module 20, a reference changing unit 30, a controller 50, and a power supply device 16 may be embodied as an IC chip 102. The IC chip 102 may include nine pins P1, P2, P8 to P11, and P13 to P15.

Unlike the aforementioned embodiments, the power supply device 16 is included in the IC chip 102. Unlike the power supply device 10 shown in FIG. 1, the power supply device 16 includes a switching unit 12 and a power transmitting unit 11, and a capacitor COUT may be formed at the outside of the IC chip 102.

A reference voltage VR and a reference current IR may be input from the reference changing unit 30 to a compensator 40 respectively through pins P9 and P10. A compensation signal VCOMP may be transmitted from the compensator 40 to the controller 50 through a pin P11, and a gate driving signal VGC may be transmitted from the controller 50 to a gate driver 60 through a pin P8.

A gate voltage VGn may be transmitted from the gate driver 60 to the power supply device 16 through a pin P13. The gate voltage VGn may control switching operation of the switching unit of the power supply device 16.

The power supply device 16 is connected to a USB connection terminal 35 through pins 14 and 15. A bus voltage VBUS is output through the pin P14, and the pin P15 is connected to a ground.

Although various embodiments in which some of the plurality of components in each vehicle charger are embodied as a monolithic chip have been described, the invention is not limited thereto and may be modified.

The vehicle chargers 1 according to the first to eleventh embodiments of the invention control at least one of bus voltages VBUS and output currents, which are outputs of the power supply devices 10 and 16, by using information on at least one of voltages and currents, which are required to charge the portable device 2, through communication with the portable device 2. For example, if information for directing the portable device 2 to be charged at high speed is received together through signals D+ and D−, the vehicle chargers 1 can control switching operation of the power supply devices 10 and 16 so that a high bus voltage VBUS suitable for charging the portable device 2 at high speed is generated. Further, a bus voltage VBUS higher than an input voltage of the portable device 2 is supplied, so that it is possible to prevent a failure that the portable device 2 is not charged and fully charged.

Although the exemplary embodiments of the invention are described above in detail, the spirit or scope of the invention is not limited thereto. All various modifications by those of ordinary skill in the art using the spirit or scope of the invention of the appended claims and equivalents may belong to the scope of the right of the invention.

DESCRIPTION OF SYMBOLS

1: Vehicle Charger
2: Portable Device
3-9, 100, 101, 102: IC Chip
10, 16: Power Supply Device
20: Communication Module
30: Reference changing unit
40: Compensator
50: Controller
60: Gate Driver
70: Protector

What is claimed is:
1. A vehicle charger, comprising:
a power supply device configured to change an input voltage into a voltage required to charge a portable device and output the changed voltage;
a communication module configured to receive a communication signal from the portable device, the communication signal including information indicating at least one of a voltage and a current, required to charge the portable device;

a reference changing unit configured to generate at least one of a reference voltage and a reference current based on the at least one of the voltage and the current indicated in the communication signal;

a compensator configured to generate a compensation signal based on a result obtained by comparing the at least one of the reference voltage and the reference current with at least one of a sensed voltage and a sensed current, which are obtained by sensing at least one of an output voltage of the power supply device and a current supplied from the power supply device to the portable device;

a controller configured to generate a gate driving signal according to the compensation signal; and a gate driver configured to generate a gate voltage for controlling switching operation of the power supply device according to the gate driving signal.

2. The vehicle charger of claim 1, wherein in changing the input voltage the power supply device is configured to step up or step down the input voltage according to the gate voltage.

3. The vehicle charger of claim 1, wherein the compensator is configured to generate the compensation signal by compensating for a difference between the sensed voltage and the reference voltage.

4. The vehicle charger of claim 1, wherein the compensator is configured to generate the compensation signal by compensating for a difference between the sensed current and the reference current.

5. The vehicle charger of claim 1, comprising a chip including at least the communication module, the reference changing unit, the compensator, and the controller.

6. The vehicle charger of claim 1, comprising a chip including at least the communication module, the reference changing unit, the controller, and the gate driver.

7. The vehicle charger of claim 1, comprising a chip including at least the communication module, the reference changing unit, the controller, and a switching unit of the power supply device.

8. The vehicle charger of claim 7, wherein the chip further comprises the gate driver.

9. The vehicle charger of claim 8, wherein the chip further comprises the compensator.

10. The vehicle charger of claim 7, wherein the chip further comprises a power transmitting unit of the power supply device.

11. The vehicle charger of claim 1, wherein the vehicle charger is configured to stop operation of the power supply device when the vehicle charger detects pollution of a USB cable terminal through which the power supply device is connected to the portable device or a connection terminal of the portable device, wherein the pollution is detected by the vehicle charger as a change in impedance between USB cable terminals.

12. The vehicle charger of claim 11, further comprising a protector configured to generate a protection signal when the protector detects the pollution of the USB cable terminal through which the power supply device is connected to the portable device or the connection terminal of the portable device.

13. The vehicle charger of claim 12, comprising a chip including at least the protector, the communication module, the reference changing unit, and the controller.

14. The vehicle charger of claim 13, wherein the chip further comprises the switching unit of the power supply device.

* * * * *